United States Patent [19]

Szendrödi et al.

[11] 4,355,840
[45] Oct. 26, 1982

[54] CLOSED VEHICLE AND A COMPLEX EQUIPMENT FOR MANAGING SERVICES AT AIRPORTS

[75] Inventors: Valér Szendrödi; Gyula Radics; Tivadar Varga; Tibor Vass; Károly Gyurics, all of Budapest, Hungary

[73] Assignee: Ikarus Karosszeria- es Jarmugyar, Budapest, Hungary

[21] Appl. No.: 107,660

[22] Filed: Dec. 27, 1979

[51] Int. Cl.$^3$ ............................................. B64F 1/31
[52] U.S. Cl. .................................. 296/179; 414/390; 414/398
[58] Field of Search ............... 296/178, 179; 414/373, 414/390, 398; 244/137 R, 137 P

[56] References Cited

U.S. PATENT DOCUMENTS

| | | | |
|---|---|---|---|
| 3,498,480 | 3/1970 | Gutridge | 414/398 |
| 3,524,558 | 8/1970 | Mastracci et al. | 414/390 |
| 3,805,704 | 4/1974 | Sehauffler | 244/137 R |
| 4,097,008 | 6/1978 | Pender | 244/137 P |

FOREIGN PATENT DOCUMENTS

| | | | |
|---|---|---|---|
| 921163 | 4/1947 | France | 296/179 |
| 383182 | 12/1964 | Switzerland | 296/179 |

Primary Examiner—Joseph F. Peters, Jr.
Assistant Examiner—Ross Weaver
Attorney, Agent, or Firm—Karl F. Ross

[57] ABSTRACT

The invention relates to a closed vehicle and a complex equipment for managing services at airports, for the direct transport of passengers and luggages from the administrating and luggage manipulating area to the airplane.

The essence of the closed vehicle according to the invention is, that a part of the passenger space is forming a flight of stairs, the height of which can be optionally adjusted, furthermore the passenger space is formed in the longitudinal centerline of the vehicle. Preferably the lifting device of the flight of stairs is fixed to the stair-step, which can be lifted to the highest point. The displacement clearance between the elements connecting the stair-steps following each other corresponds to the height of the stair-step. The attainable maximal height of stairs is determined by the number of stair-steps applied.

Preferably, the luggage space is arranged below the passenger space; in the luggage space at least one continuous transit path is formed. The passenger space and the luggage space have plain floors and are formed continuously in the longitudinal centerline of the closed vehicle.

Both the passenger space and the luggage space, or at least one of them is provided with aperture closing means on the frontal side, while both spaces may be provided with an aperture and in a given case with aperture closing means in the lateral direction of the vehicle.

8 Claims, 2 Drawing Figures

CLOSED VEHICLE AND A COMPLEX EQUIPMENT FOR MANAGING SERVICES AT AIRPORTS

FIELD OF THE INVENTION

The present invention relates to a closed vehicle and related equipment for managing services at airports, especially for transporting the passengers together with their luggage from a given area to the airplane and, more particularly, for improving the services relating to the administration of the passengers and manipulation of the luggage at airfields, thereby simultaneously increasing the passenger handling capacity of the airfield.

BACKGROUND OF THE INVENTION

As is well known, at airports the passengers and their luggage at the place of check in are separated from each other: as a consequence, passengers and luggage each go their own way.

One of the drawbacks of this kind of service that automation has not been possible: as a consequence, the manual work has required a large staff. Administration of passenger transfer takes place at a reduced speed and due to frequent errors, reliability is rather dubious. Finally the capacity of the airplanes relating to the number of the passengers to pass is always less than the nominal capacity. To make matters worse, seasonal fluctuation always results in confusion, mainly in peak travel periods.

According to international estimation, not even the most up-to-date computer-controlled system has been able to ensure 99% safety in routing the luggage, even during peak hours when personal intervention beside the computered control has been provided.

It is also well known, that at the prevailing passenger service systems, where computer control is generally used, loading of the luggage is performed manually. In manual operation —due to frequent sorting and loading— damages to the luggage are unavoidable. A further disadvantage of manual luggage handling is that actions endangering the safety of the flight cannot be avoided.

Presently the transmitting capacity of airports is adversely affected by the complexity of the passenger flow, utilizing different corridors and gates.

In order to reduce these drawbacks the so-called plane-mate-system and similar systems of passenger transport have been proposed. The essence of these systems is that the passengers do not walk through different corridors to the airplane but after the requisite administration of the passengers and delivery of the luggage, the passengers are transported in a special passenger carriage to the airplane. The passenger space is lifted to the door height of the airplane, and, the passengers may go directly to the airplane from the closed passenger carriage.

The system described has certain disadvantages. The main disadvantage is that the luggage travels along a separate path to the airplane. Since—as is well known—managing of the luggage requires much more time than passenger administration, the time needed for handling the luggage will determine the transmitting capacity of the airport.

A further disadvantage is that lifting and lowering the complete passenger carriage is slow and time-consuming operation, requiring a complicated and expensive structure. Due to its width, amounting to 3.5 to 5 m, the vehicle can traffic public roads only by observing the prescriptions valid for vehicles of special size. As a consequence, the vehicle can not be used for transporting a group of passengers from a given place outside the airport to the airplane while travelling on a public road.

OBJECT OF THE INVENTION

The principal object of the invention is to provide an improved system of passenger transport whereby disadvantages of the system considered as the most modern system up-to-now are avoided. Another object is to increase transmitting capacity of a given airport in such manner that the passengers and their luggage are simultaneously transported on the same path over a shortened period to the airplane, but nevertheless separated from each other. It is also an object to provide a fully mechanized handling and manipulation of the luggage, beginning from the acceptance to loading into the airplane itself.

It is also an object to provide a system which utilizes a vehicle whose size does not surpass that of the busses currently in use on public roads, and which can transport passengers into the airplane without the necessity of change, simultaneously avoiding lifting of the complete passenger space of the vehicle body.

The programme outlined above is enumerated among the tasks and problems to be solved in the future on pages 2, 3 and 7 of the dissertation published by the Information Centre of Aviation LRI, 1.4/1977.

SUMMARY OF THE INVENTION

The invention provides a closed vehicle, preferably a bus for the direct transport of passengers and their luggages from a given area to the airplane. The luggage space and the passenger space of the closed vehicle are well separated from each other.

An essential of the invention is that a part of the passenger space forms a stair construction, the height of which can be optionally adjusted. The luggage space is formed along the longitudinal centerline of the vehicle below the passenger space and stair construction.

The stair construction is provided with a lifting device, which is fixed to the stair-step to be lifted to the highest point. Between the elements connecting the steps following each other the possibility of a vertical restricted displacement is given, by means of which the geometry of a stair known in itself can be realized. The attainable maximum height of the flight of stairs is determined by the number of stair-steps used.

According to one of the preferable embodiments of the invention the luggage space is arranged below the passenger space. The luggage space can be formed in such a manner too, that it should contain at least one transit path. In case of several transit paths these are separated from each other within the luggage space. Preferably, the closed vehicle should be formed in such a manner that the floors of the passenger space and the luggage space are flat (planar).

According to a further preferred embodiment of the invention both the passenger space and the luggage space are continuously arranged in the line of the longitudinal axis of the closed vehicle. Expediently, both the passenger space and the luggage space, but at least one of them is provided at the frontal side with aperture closing means. Furthermore, the closed vehicle according to the invention may be formed in such a manner that either the passenger space or the luggage space or both are provided with an aperture and in a given case with aperture closing means arranged in lateral direction. The luggage space can be formed in a manner known per se, as a transient path for receiving containers and luggage sorting boxes.

The invention also relates to a complex equipment for managing services at the airport, for transporting the passengers and their luggage from the airport area into the space of the airplane and for developing the passenger and luggage service at airports; a further aim of the invention has been to increase the transmitting capacity of the airports by using the vehicle according to the invention or any other vehicle known in itself.

The room serving for administering the tickets and handling the luggage is connected to the room in which the passengers board the vehicle and to the space, where the luggage is stored. The essence of the processing equipment is that the luggage-storing place includes several compartments separated from each other according to the single flights and each one of said compartments is arranged in the immediate vicinity of the place at which boarding for the flight in question takes place, expediently below them, but having been completely separated from them.

Between the spaces serving for the manipulation of the luggage and administration of the ticket and the luggage storing place, respectively, there are conveyor paths arranged to ensure direct connection and possibility of loading.

Between the space, where the passengers board the vehicle and the luggage-storing place and between the luggage-storing place of the airplane and the luggage storing areas of the vehicle well-known conveying and loading equipments are arranged.

The advantages of the closed vehicle according to the invention are considerable:

Although the luggage and the passengers are separated from each other, spatially and timely passenger and luggage are simultaneously forwarded into the airplane.

From the moment of acceptance till the arrival to the airplane (included the loading of the luggage into the airplane) the whole process is automated and manual work is not required at all. The process takes place in a reliable and quick manner, whereby the transmitting capacity of the airport can be considerably increased even in seasonal peak-periods. Safety of routing can be also increased, i.e. possibility of errors may be eliminated. As repeated sorting and manipulation of the luggage becomes superfluous, damages of the luggage—inevitable up-to-now—can be also avoided. Prevention of actions endangering the safety of flight can be executed to an increased extent.

It should be mentioned as a considerable advantage, that the sizes of the closed vehicle according to the invention do not exceed those of the busses used on public roads. As a consequence, traffic without special permission becomes possible. By the closed vehicle according to the invention the passengers and the luggages may be transported on public roads from any place lying remote from the airport directly to the airplane. A further advantageous feature is that direct transport of the passengers into the airplane takes place without lifting or lowering the entire passenger space, as a consequence, the task may be fulfilled by the aid of relatively simple means and quickly.

BRIEF DESCRIPTION OF THE DRAWING

The invention is described in greater detail with reference to the accompanying drawing, in which.

SPECIFIC DESCRIPTION

Figure 1:
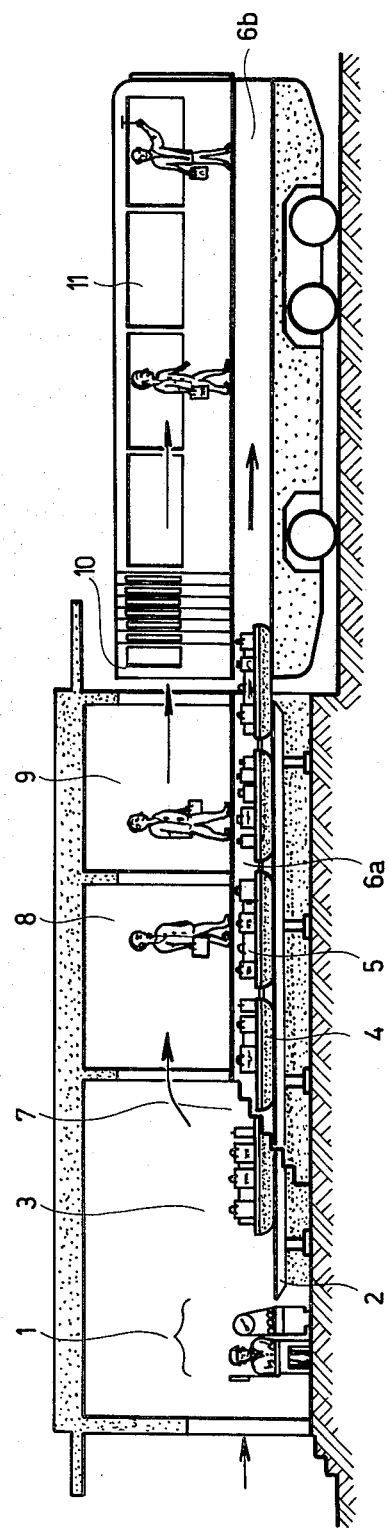
FIG. 1 is a diagrammatic elevational view showing schematically the passenger administration and a closed vehicle according to the invention in course of loading the luggage and boarding of the passengers.

Referring to FIG. 1 a passenger checks in at the region 1, where passenger and luggage are processed. After having his tickets and luggage 5 processed, the passenger proceeds to the transit waiting hall 8 up the stairs 7. From the space 9—having been separated in accordance with the single flights—the passenger passes through the gate 10 directly into the passenger space 11 of the closed vehicle. At the same time, the luggage 5 having been processed in the space 1 is loaded at the place 3 into the empty container 4 arranged on the luggage routing path 2. The luggage 5 of the passengers of the single flights are collected in the loaded containers 4, whereas the container 4 are collected in the luggage space 6a below the space 9, from which the passengers board the vehicle. As is to be seen in the figure, at the same time that the passengers board the closed vehicle, the containers are loaded into the luggage space 6b below the passenger space, in the direction indicated by the arrow. Transport of the containers 4 from the space at which passengers and luggage are processed to the place of loading is fully mechanized, by means of a conveyor belt, not illustrated here. Within the luggage space 6b of the closed vehicle the containers already loaded into said space are advanced also by means of a conveyor belt.

Figure 2:
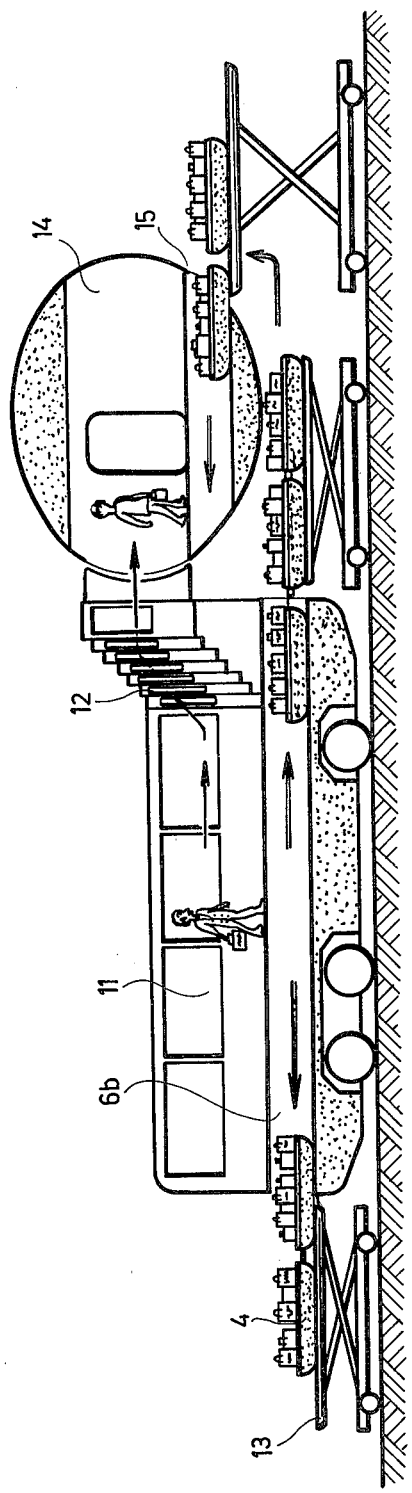
FIG. 2 is a similar diagrammatic view showing the airplane and the closed vehicle according to the invention, when the passengers are embarking and the luggages is transferred from the closed vehicle to the airplane in a fully automated manner.

As is to be seen from FIG. 2, the closed vehicle stops close to the embarkation aperture of the airplane, turning with its frontal side towards the aperture. A part of the passenger space 11 is formed with a flight of stairs 12, which is constructed in such a manner that it can be easily elevated; the passengers thus may directly enter the airplane. The flight of stairs 12 with the lifting device (not illustrated here) is constructed in the known manner.

In case of the preferred embodiment described here, the rod of the lifting device is fixed to the stair-step lying next to the passenger space of the airplane 14. The single stair-steps are fixed to each other by means of connecting elements known per se. The clearance of the displacement between the connecting elements corresponds to the desired height of the stair-step. The attainable maximal height of the stair will be defined by the number of the stair-steps provided.

From the luggage space 6b of the closed vehicle the containers 4 are placed onto the loader 13, from where they are advanced by known mechanized loading devices into the luggage space of the airplane.

In case of the embodiment described here the luggage space 6b is formed as one single transit path. It goes without saying, that within the closed vehicle several transit paths separated from each other can be formed.

As is to be seen from FIGS. 1 and 2, both the passenger space 11 and the luggage space 6b are formed with a plain floor. The figures show, that both the luggage space 6b and the passenger space 11 are formed continuously along the longitudinal axis of the closed vehicle. The passenger space 11 and the luggage space 6b, or at least one of them should be provided with aperture closing means on the frontal side.

Both the passenger space 11 and the luggage space 6b, or at least one of them, can be provided with an aperture in lateral direction and in a given case aperture closing means may also be used. The luggage space 6b is formed as a transit path suitable for the receipt of the luggage sorting boxes and containers, respectively. At the arrival of the airplane at the place of destination, transport of the passengers and loading of the luggages 5 is to be performed in a reversed sequence of operation.

What we claim is:

1. A system for processing passengers and luggage at an airport, comprising:

means defining a passenger and luggage processing chamber wherein passenger tickets of respective passengers can be examined and checked and luggage assigned to each passenger can be checked in;

a waiting room connected to said chamber and adapted to accommodate passengers processed in said chamber;

luggage-displacing means extending below said waiting room and connected with said chamber for advancing luggage from said chamber along a path substantially parallel to the path traveled by passengers from said chamber to said waiting room; and an elongated bus-type vehicle alignable with said waiting room and formed with an elongated vehicle body having wheels and defining a passenger space above and separated from a luggage space, said passenger and luggage spaces both extending longitudinally along said vehicle, whereby passengers advancing onto said vehicle and into said passenger space are parallelled by movement of luggage from beneath said waiting room onto said vehicle and into said luggage space, said body being formed with an elevatable stairway at one end of said passenger space for communication with an aperture in an aircraft.

2. The system defined in claim 1 wherein said elevatable stairway comprises a vertically adjustable flight of stairs, and a lifting device is affixed to a step of the flight of stairs adapted to be lifted to the highest point, the steps of the flight being interconnected so that the flight has a maximum height determined by the number of steps.

3. The system defined in claim 1 wherein said luggage space extends in at least one continuous path from one end of the body to the other end thereof.

4. The system defined in claim 1 wherein said passenger space and said luggage space are each formed with a respective planar floor.

5. The system defined in claim 1 wherein both the passenger space and the luggage space extend continuously along the longitudinal center of the vehicle body.

6. The system defined in claim 1 wherein at least one of said spaces is provided with at least one opening, further comprising closing means adapted to close said opening.

7. The system defined in claim 1 wherein said luggage space is formed with means with a mechanical displacement of luggage-sorting containers.

8. The system defined in claim 1, further comprising conveyor means beneath said waiting room and in said luggage space for advancing luggage-carrying containers therethrough.

* * * * *